(12) United States Patent
Aaron et al.

(10) Patent No.: US 9,402,054 B2
(45) Date of Patent: Jul. 26, 2016

(54) PROVISION OF VIDEO CONFERENCE SERVICES

(71) Applicant: Blue Jeans Network, Mountain View, CA (US)

(72) Inventors: Stu Aaron, Mountain View, CA (US); Oded Gal, Mountain View, CA (US); Sunil George, Bangalore (IN); Pradeep Malhotra, Bangalore (IN); Ashish Nagpal, Bangalore (IN); Alagu Periyannan, Mountain View, CA (US); Anand Raghavan, Mountain View, CA (US); Krish Ramakrishnan, Mountain View, CA (US); Emmanuel Weber, Mountain View, CA (US)

(73) Assignee: Blue Jeans Network, Mountain View, CA (US)

( * ) Notice: Subject to any disclaimer, the term of this patent is extended or adjusted under 35 U.S.C. 154(b) by 0 days.

(21) Appl. No.: 14/624,459

(22) Filed: Feb. 17, 2015

(65) Prior Publication Data

US 2016/0165184 A1 Jun. 9, 2016

(30) Foreign Application Priority Data

Dec. 8, 2014 (IN) .......................... 6197/CHE/2014

(51) Int. Cl.
*H04N 7/15* (2006.01)
(52) U.S. Cl.
CPC ...................................... *H04N 7/15* (2013.01)
(58) Field of Classification Search
CPC ...................................................... H04N 7/15
USPC ......... 345/156; 348/14.08, 143, 14.09, 211.6; 370/230, 252, 260, 352, 468; 379/158, 379/202.01; 382/251; 434/350; 709/204, 709/227; 715/821
See application file for complete search history.

(56) References Cited

U.S. PATENT DOCUMENTS

| | | | | |
|---|---|---|---|---|
| 6,122,259 A * | 9/2000 | Ishida | ................... | H04M 3/567 348/E7.082 |
| 6,256,423 B1 * | 7/2001 | Krishnamurthy | ...... | H04N 19/30 375/E7.083 |
| 6,356,533 B1 * | 3/2002 | Bruno | ..................... | H04L 12/12 370/252 |
| 6,496,479 B1 * | 12/2002 | Shionozaki | ........ | H04Q 11/0478 370/230 |
| 7,155,158 B1 * | 12/2006 | Iuppa et al. | ............ | G09B 9/003 434/236 |
| 7,430,288 B2 * | 9/2008 | Yoshida | ................... | H04Q 3/62 370/260 |
| 7,558,221 B2 * | 7/2009 | Nelson | ................... | H04N 7/147 348/14.08 |
| 7,631,039 B2 * | 12/2009 | Eisenberg | ........... | H04L 12/1813 370/259 |
| 7,929,011 B2 * | 4/2011 | Elbaze | ..................... | H04N 7/15 348/14.08 |

(Continued)

*Primary Examiner* — Gerald Gauthier
(74) *Attorney, Agent, or Firm* — Ascenda Law Group, PC

(57) ABSTRACT

Embodiments are described for provision of video conference services. In some embodiments, a service connector module of a video conference system receives a request to switch a participant user of a video conference to a communication mode for the video conference received at a participant endpoint device, the request to switch is (a) a request to switch from an unidirectional communication mode to a bidirectional communication mode, or (b) a request to switch from the bidirectional communication mode to the unidirectional communication mode, determining information on at least one distribution capability from one or more interactions with the participant endpoint device, determines a distribution scheme for the communication mode using the at least one distribution capability, sends a request to establish a connection with the endpoint device using the distribution scheme, receives a notification on establishment of the connection, and sends a request to terminate a prior connection.

15 Claims, 14 Drawing Sheets

(56) References Cited

U.S. PATENT DOCUMENTS

| | | | |
|---|---|---|---|
| 8,207,937 B2* | 6/2012 | Ambuehl | H04B 7/265 345/156 |
| 8,482,593 B2 | 7/2013 | Periyannan et al. | |
| 8,508,574 B2* | 8/2013 | Bozionek | G06Q 30/02 348/14.07 |
| 8,514,263 B2 | 8/2013 | Periyannan et al. | |
| 8,875,031 B2 | 10/2014 | Periyannan et al. | |
| 8,885,013 B2 | 11/2014 | Periyannan et al. | |
| 8,922,665 B2* | 12/2014 | Cooper | H04N 1/00204 348/14.12 |
| 8,982,177 B2* | 3/2015 | Modai | H04N 7/15 297/135 |
| 9,035,997 B2 | 5/2015 | Periyannan et al. | |
| 9,041,765 B2 | 5/2015 | Periyannan et al. | |
| 9,053,243 B2* | 6/2015 | Townsend | G06F 13/385 |
| 9,124,757 B2 | 9/2015 | Weber | |
| 9,143,729 B2 | 9/2015 | Anand et al. | |
| 9,232,191 B2 | 1/2016 | Periyannan et al. | |
| 9,282,287 B1* | 3/2016 | Marsh | H04N 7/15 |
| 2005/0062843 A1* | 3/2005 | Bowers | H04N 7/152 348/14.08 |
| 2006/0171336 A1* | 8/2006 | MacDonald | H04N 7/152 370/260 |
| 2007/0002779 A1* | 1/2007 | Lee | H04W 4/10 370/260 |
| 2007/0022200 A1* | 1/2007 | Benkert | H04L 2/06027 709/227 |
| 2009/0016512 A1* | 1/2009 | Bryant | H04L 12/1822 379/202.01 |
| 2009/0244278 A1* | 10/2009 | Taneja | G06Q 10/10 348/143 |
| 2010/0251177 A1* | 9/2010 | Geppert | G06F 3/04817 715/821 |
| 2010/0309284 A1* | 12/2010 | Samadani | G06Q 10/10 348/14.08 |
| 2011/0254913 A1* | 10/2011 | Mochida | H04L 12/1818 348/14.08 |
| 2013/0077618 A1* | 3/2013 | Jones | H04L 12/66 370/352 |
| 2014/0003450 A1* | 1/2014 | Bentley | H04N 7/15 370/468 |
| 2014/0092203 A1 | 4/2014 | Periyannan et al. | |
| 2014/0313278 A1 | 10/2014 | Periyannan et al. | |

* cited by examiner

FIG. 8

| Select Moderator | Select Presenters | Select Attendee |

List of Moderators ralphsingh@softcoinc.com | ✖

Message (Optional)

Hi Ralph, you will kick off this sales meeting - John

FIG. 9

| Select Moderator | Select Presenters | Select Attendee |

List of Presenters bettylee@softcoinc.com | ✖

FIG. 10

| Select Moderator | Select Presenters | Select Attendee |

List of Presenters stephnoone@softcoinc.com | ✖     debragreene@softcoinc.com | ✖ davidlee@softcoinc.com | ✖

BlueJeans

Sales Kickoff
Mon Jan 26 18:00 PST

EVENT DETAILS:
West region sales meeting

ATTEND

If you can't access the event link above, please click on the below provided link or paste this in your browser url.

http://a2m.a.bluejeans.com/a2m/live-event/APO6AKooEqwK

 Connecting directly from a Room System?

1) Dial : 199.48.152.51 or a.bin.vc
2) Enter Meeting ID: 442694000 and Passcode: 5138

 Just want to DIAL IN ? [US and Canada only]

1) Dial:
 +1 408 757 0979
 +1 408 757 0979
2) Enter Conference ID: 442694000 and the Passcode: 5138

FIG. 13

PROVISION OF VIDEO CONFERENCE SERVICES

RELATED APPLICATIONS

This application claims priority to Indian Application No. 6197/CHE/2014 filed Dec. 8, 2014, which is incorporated herein by reference.

FIELD OF INVENTION

The present invention is directed to the provision of video conference services.

BACKGROUND

In conventional approaches for the provision of a video conference to a large number of users (e.g., thousands of users), the video conference is streamed to user devices, and there is limited interaction between individual users viewing the video conference and between the users and the speakers on the video conference. Typically, the only interaction with the speaker and/or the other users viewing the conference available to the user is by participating in an online chat associated with the event or sending email messages to particular users. As such, an improved approach to the provision of video conference services that allows for more interactions between users viewing, listening, and speaking during the video conference is needed.

SUMMARY

Embodiments are described for provision of video conference services. In some embodiments, a service connector module of a video conference system receives a request to switch a participant user of a video conference to a communication mode for the video conference received at a participant endpoint device, the request to switch is (a) a request to switch from an unidirectional communication mode to a bidirectional communication mode, or (b) a request to switch from the bidirectional communication mode to the unidirectional communication mode, determining information on at least one distribution capability from one or more interactions with the participant endpoint device, determines a distribution scheme for the communication mode using the at least one distribution capability, sends a request to establish a connection with the endpoint device using the distribution scheme, receives a notification on establishment of the connection, and sends a request to terminate a prior connection

BRIEF DESCRIPTION OF THE DRAWINGS

FIG. 8 is an exemplary user interface in accordance with some embodiments of the invention;

FIG. 9 is an exemplary user interface in accordance with some embodiments of the invention;

FIG. 10 is an exemplary user interface in accordance with some embodiments of the invention;

FIG. 13 is an exemplary user interface in accordance with some embodiments of the invention;

DETAILED DESCRIPTION

Figure 1:
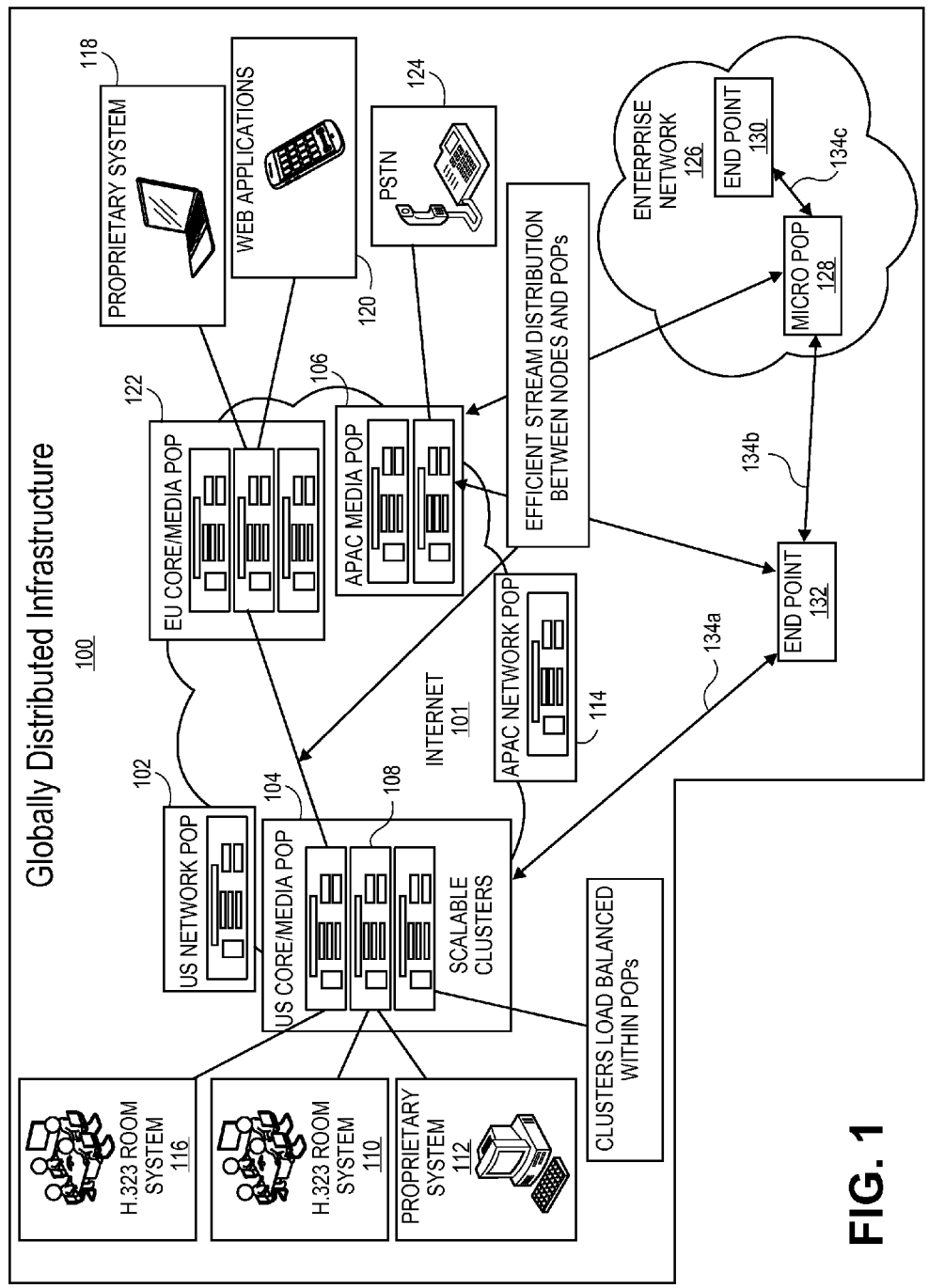
FIG. 1 depicts an exemplary system in accordance with some embodiments of the invention.

Embodiments of apparatuses, systems, computer readable mediums, and methods for the provision of video conference services with a capability to switch between a unidirectional communication mode to a bidirectional communication mode for distribution of a communication event to a participant endpoint are described. Capabilities of the participant endpoint device and/or a client application used by a participant user on the endpoint device to access the video conference may be considered in order to determine a preferred distribution scheme for the participant endpoint to support the switch in communication mode. A distribution scheme may be a network infrastructure elements used, a protocol, a type of connection established, a number of channels used, and/or any other aspect of the distribution of the video conference that may be selected.

A distribution scheme for a bidirectional communication mode may allow: (1) a participant endpoint device to send data for contribution to a composite of data streams for the video conference that will be shared with participants of the video conference, and (2) a participant endpoint device to receive the composite of data streams for the video conference and/or received data streams at the endpoint device to form the composite. A distribution scheme for a unidirectional communication mode may allow a participant endpoint device to receive the composite of data streams for the video conference and/or received data streams at the endpoint device to form the composite. In some embodiments, the video conferencing system may support a communication event with a large number of participant endpoints. For example, a video conference may be distributed in a unidirectional communication mode to thousands of participant endpoints for the communication event and distribution of a video conference to at most a hundred participant endpoints in a bidirectional communication mode.

Some embodiments provide a moderator with a capability to authorize a switch of a participant endpoint from the distribution scheme supporting a unidirectional communication mode to the distribution scheme supporting a bidirectional communication mode for the communication event, and vice versa. In particular embodiments, each participant user of a communication event is assigned a role by a moderator that is defined to have a particular communication mode and/or responsibilities, and the participant user may send requests to change their role and corresponding communication mode.

The video conference system configured in accordance with some embodiments of the present invention may provide a user interface for presentation of the received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013), U.S. patent application Ser. No. 13/105,684, entitled "Systems and Methods for Real-time Multimedia Communications Across Multiple Standards and Proprietary Devices," filed on May 11, 2011 (issued as U.S. Pat. No. 9,035,997 on May 19, 2015), U.S. patent application Ser. No. 13/919,576, entitled "Systems and Methods for Scalable Composition of Media Streams for Real-time Multimedia Communication," filed on Jun. 17, 2013, U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013), U.S. patent application Ser. No. 13/955,646, entitled "Systems and Methods for Scalable Distributed Global Infrastructure for Real-time Multimedia Communication," filed on Jul. 31, 2013 (issued as U.S. Pat. No. 9,232,191 on Jan. 5, 2016), U.S. patent application Ser. No. 13/105,704, entitled "Systems and Methods for Security and Privacy Controls for Videoconferencing," filed on May 11, 2011 (issued as U.S. Pat. No. 9,041,765 on May 26, 2015), U.S. patent application Ser. No. 13/105,716, entitled "Systems and Methods for Shared Multimedia Experiences in Virtual Videoconference Rooms," filed on May 11, 2011 (issued as U.S. Pat. No. 8,875,031 on Oct. 28, 2014), U.S. patent application Ser. No. 13/105,719, entitled "Systems and Methods for Novel Interactions with Participants in Videoconference Meetings," filed on May 11, 2011 (issued as U.S. Pat. No. 8,885,013 on Nov. 11, 2014), U.S. patent application Ser. No. 13/105,723, entitled "Systems and Methods for Real-time Virtual-reality Immersive Multimedia Communications," filed on May 11, 2011 (issued as U.S. Pat. No. 9,143,729 on Sep. 22, 2015), and U.S. patent application Ser. No. 13/251,913, entitled "Systems and Methods for Error Resilient Scheme for Low Latency H.264 Video Coding," filed on Oct. 3, 2011 (issued as U.S. Pat. No. 9,124,757 on Sep. 1, 2015), each incorporated herein by reference in its respective entirety.

The video conference system is described in more detail with reference to FIGS. 1 and 2, and, as illustrated, may support a variety of video conferencing feeds of audio, video, audio and video, and/or other media data streams from video conferencing participant endpoints to present a video conference. An endpoint may be any type of device, including, but not limited to: laptops, computers, smartphones, tablets, phones, audio and video conferencing system devices, and/or any other device capable of sending and receiving data streams over a network. Participants may use proprietary, standards-based communication protocols, and/or any other protocols with their devices, and the video conference system may enable a multi-party and/or point-to-point (e.g., between two endpoints) video conference session among the plurality of participant endpoints.

As a non-limiting example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, the following: H.323 and Session Initiation Protocol (SIP). For bidirectional communication, the video conference system may support, but is not limited to, the following, protocols: SIP, H.323, and Extensible Messaging and Presence Protocol (XMPP). For unidirectional communication, the video conference system may support, but is not limited to, the following protocols: Real Time Streaming Protocol (RTSP), Real Time Messaging Protocol (RTMP), IGMP, and peer to peer. Additionally, the video conference system may support data streams from a media gateway that converts digital media streams between disparate telecommunication networks, such as from devices using public switched telephone networks (PSTN), SS7, and Next Generation Networks. The video conference system may also support streaming communications protocols, such as HTTP Live Streaming (HLS), HTTP Dynamic Streaming (HDS), MPEG-DASH, and/or any other streaming protocol.

Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants. Each video conference provides participant users with a rich set of conferencing and collaboration interaction.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

A globally distributed infrastructure for the video conference system supports the sharing of the event (e.g., the session) among the participants at geographically distributed locations with the use of a plurality of MCUs (Multipoint Control Units), each configured to process the plurality of audio and/or video streams from the plurality of video conference endpoints in real time. Those with skill in the art will recognize that a globally distributed infrastructure is not required to practice the invention. A geographically distributed architecture and/or simply a distributed architecture may be implemented to practice the invention.

Compared to conventional video conference system approaches that require every participant to the video conference to follow the same communication standard or protocol and/or use the same client application from a communication service provider, a video conference supported by the globally distributed infrastructure with at least one MCU at a media server allows the participants of a video conference to participate in a multi-party or point-to-point video conference session in device, address scheme, protocol, and/or communication service provider independent fashion. By conducting manipulation of the video and audio streams transparently in on a remote server (e.g., a server of a POP that is accessible via one or more networks or networks of networks) without end user involvement, the proposed approach brings together video conference systems and applications of different devices, different protocols of video conferencing, and/or different communication services from communication service providers as one integrated system. Communication service providers may include, but are not limited to, the following: providers of Voice over Internet Protocol (VoIP), instant messaging services supporting voice and/or data, and/or service provider with applications that allow for transport of information electronically.

In particular, the video conference system provides the integration of services from different communication service providers (e.g., Skype, and Google Talk) that support different addressing schemes for identifying users on devices. For example, a participant user may login to a Skype client to join a video conference using a communication service identifier (e.g., username, Skype id) and communicate with a participant user who logins to a Google Talk client using an email address. Ordinarily, a communication service provider may require a user to identify each participant on the communication session with an identifier registered with the communication service (e.g., communication service identifier, email address, username, etc.), so that the communication service provider may look up the address of the user endpoint to communicate, and the communication service provider may not support integration with other communication services. The video conference system integrates with the communication service provider services/system seamlessly for the user, so that the user can login with any client application with an identifier registered with the communication service provider and participate in the video conference.

In some embodiments, the endpoint for a participant using a client application is communicating with a corresponding client application for the communication service provider executing as a virtual client application on a server in the backend. A virtual client application is a client application that may be executed on a server of the video conference system to receive data streams from the client application executing on a participant endpoint device, and the output or presentation of the data streams within the virtual client application may be captured and combined with other data streams to form a composite for the video conference. Examples of approaches to video conference systems that support different communication services that may be practiced in some embodiments are provided in U.S. patent application Ser. No. 13/105,684, entitled "SYSTEMS AND METHODS FOR REAL-TIME MULTIMEDIA COMMUNICATION ACROSS MULTIPLE STANDARDS AND PROPRIETARY DEVICES" filed on May 11, 2011 (issued as U.S. Pat. No. 9,035,997 on May 19, 2015), and U.S. patent application Ser. No. 14/217,275, "METHOD AND SYSTEMS FOR INTERFACING HETEROGENOUS ENDPOINTS AND WEB-BASED MEDIA SOURCES IN A VIDEO CONFERENCE," filed Mar. 17, 2014, each incorporated herein by reference in its respective entirety.

Hosting the video conference on at least one media server accessible on a network (e.g., Internet/cloud) allows for the participants to initiate a video conference with any device, supporting any communication protocol, and any client application from a communication service provider, have the system communicate with the other participants at each of their selected endpoint devices, and the other participants may accept the request to join the video conference from any endpoint device using any client application from any communication service provider that he/she wishes. A video conference hosted on a server accessible over the Internet/cloud enables any participant to be able to upload media content to a server (i.e., a node) of the global distributed infrastructure accessible over the Internet (e.g., in the cloud) and have it be retransmitted to other participants in formats of their choice transparently, with or without modifications.

Distributed Infrastructure

FIG. 1 depicts an exemplary system, in accordance with some embodiments of the invention. As shown in FIG. 1, to support the operations of video conferencing, one or more media processing nodes (known in the industry as an MCU) (e.g., nodes of 102, 104, 106, 114, and 122) are used to process and compose video conference feeds from various endpoints, and in particular, the media processing nodes of the globally distributed infrastructure 100 are able to offer a multi-protocol bridging solution to deliver content to disparate endpoints. In the example of FIG. 1, a globally distributed infrastructure 100 enables efficient and scalable processing and compositing of media streams by building the MCUs as the media processing nodes (e.g., 102, 104, 106, 114, and 122) for video stream processing from off-the-shelf components, such as Linux/x86 Central Processing Units (CPUs) and PC Graphics Processing Units (GPUs) instead of custom hardware. These MCUs can be deployed in a rack-and-stack cloud-computing style and hence achieves the most scalable and cost/performance efficient approach to support the video conferencing service. The x86 architecture has improved vastly over the years in its Digital Signal Processing (DSP) capabilities and is able to now support the processing for the video conference system in some embodiments. Additionally, off-the-shelf GPU used for rendering PC graphics can be used to augment the processing power of the CPU and/or any other processor.

In the example of FIG. 1, the globally distributed infrastructure 100 that supports and enables the operations of the video conference has at least one or more of the following attributes:

(1) Ability to support wide variety of audio video formats and protocols;
(2) Scalable mixing and composition of the audio and video streams;
(3) Service delivered across the globe with minimized latency; and
(4) Capital efficient to build and cost efficient to operate.

In some embodiments, globally distributed infrastructure 100 may be implemented with clusters of x86 servers both locally on a LAN as well as across geographies serving as the media processing nodes for the MCUs to achieve near unlimited scaling. All of the media processing nodes of the clusters (e.g., 102, 104, 108, 106, and 114) may work together forming one giant MCU. In some embodiments, such clustered design makes use of network layer multicast and a novel multi-bit-rate stream distribution scheme to achieve the unlimited scaling. The globally distributed infrastructure 100 is able to achieve great scalability in terms of the number of participants per call, geographic distribution of callers, as well as distribution of calls across multiple POPs worldwide.

By way of a non-limiting example, globally distributed infrastructure 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. Those with skill in the art will recognize that an implementation of the globally distributed infrastructure 100 for the video conference system with the same number and/or geographic locations for Core Media and/or Network POPs of FIG. 1 is not required and any number of Core Media POPs and Network POPs may be used to provide a content delivery network 103 for a video conference system. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP, described in more detail with FIG. 2) that can handle the processing for the conference so as to allow them to minimize their latency.

Once the participants are in communication with a POP of the globally distributed infrastructure 100, their conference feeds of audio and video streams can be carried on a high performance network POPs (e.g., US Network POP 102, APAC Network POP 114) between the POPs. Additionally, in some embodiments, Network POPs (e.g., US Network POP 102, APAC Network POP 114) can be used for communication (e.g., traffic) with users in places where a Core Media POP does not exist. By way of example, an endpoint can communicate with a Network POP in a more optimal location for communication than the nearest Core Media POP, and the Network POP may send/forward the traffic to a Core Media POP over a private dedicated network so as to avoid use of the open Internet. The globally distributed infrastructure 100 enables media processing nodes to act as one single system.

FIG. 1 depicts an example of a system for media stream distribution processing that may be achieved locally on a Local Area Network (LAN) present in each POP and/or across multiple POPs on the Wide Area Network (WAN). For example, media stream distribution may be handled with a single node media distribution using a single POP (as shown with the use of server 108), where video conference feeds from participants to a video conference via for non-limiting examples, room systems running H.323 (as shown with 110), PCs running H.323, PCs running Skype (as shown with 112), all connect to one node in a POP (as shown with 108) based on proximity to the conference host, where the video conference feeds are load balanced but not clustered among nodes in the POP. In another example, media stream distribution may be handled with clustered nodes media with a POP (as shown with 104), wherein video conference feeds from the participants (e.g., 110, 112, and 116) are load balanced among cluster of nodes at the POP, and the audio/video streams are distributed/overflowed among the nodes in the POP. In another example, media stream distribution processing may be handled with complete media distribution among both the cluster of nodes within the POP (e.g., 104) and among different POPs (e.g., 102, 106, 114, and 122) as well, where some participants to the conference may connect to their closest POPs (e.g., 118 and 120 connect to 122, and 124 connects to 106) instead of a single POP.

In some embodiments, the globally distributed infrastructure 100 may have one or more other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

In some embodiments, the globally distributed infrastructure may have a Micro Point of Presence (MicroPOP) 128. Endpoint 132 may execute a client application that is used to request media processing services from a US Core Media POP 104 as shown with 134a or a Micro POP 128 as shown with 134b. Endpoint 130 may execute a client application that can only access the Micro POP 128 as shown with 134c and cannot access a Core Media POP (e.g., 104 and 106). Hardware and/or software forming a MicroPOP may be located, accessible, and placed into an enterprise network 126 (e.g., LAN and/or WAN) and offer a set of media processing services for endpoints with access to the enterprise network. An enterprise may be an organization, a corporation, a company, a service provider, a customer, a population of a city or country, and/or any other identifiable group of users with a network. The media processing services request may be a request to join a video conference session, a request to initiate a video conference session, a request to continue participating in a video conference session, and/or any other request of media processing services offered by the video conference system.

Upon receipt of the request at the respective POP (e.g., 104 and 128), a load balancer may determine whether load balancing is desired based on load balancing metrics. Examples of load balancing that may be practiced in some embodiments are provided in U.S. patent application Ser. No. 14/217,195, entitled "PROVISION OF VIDEO CONFERENCING WITH LOAD BALANCING," filed Mar. 17, 2014, and incorporated herein by reference in its entirety. Examples of POPs within enterprise networks (e.g., Micro POPs) that may be practiced in some embodiments are provided in U.S. patent application Ser. No. 14/216,363, entitled "PROVISION OF VIDEO CONFERENCING SERVICES USING A MICRO POP TO EXTEND MEDIA PROCESSING INTO ENTERPRISE NETWORKS," filed Mar. 17, 2014, and incorporated herein by reference in its entirety. Micro POPs may have a POP architecture 200 in a globally distributed infrastructure 100 for a conference system and offer a set of services to endpoints within an enterprise network.

Figure 2:
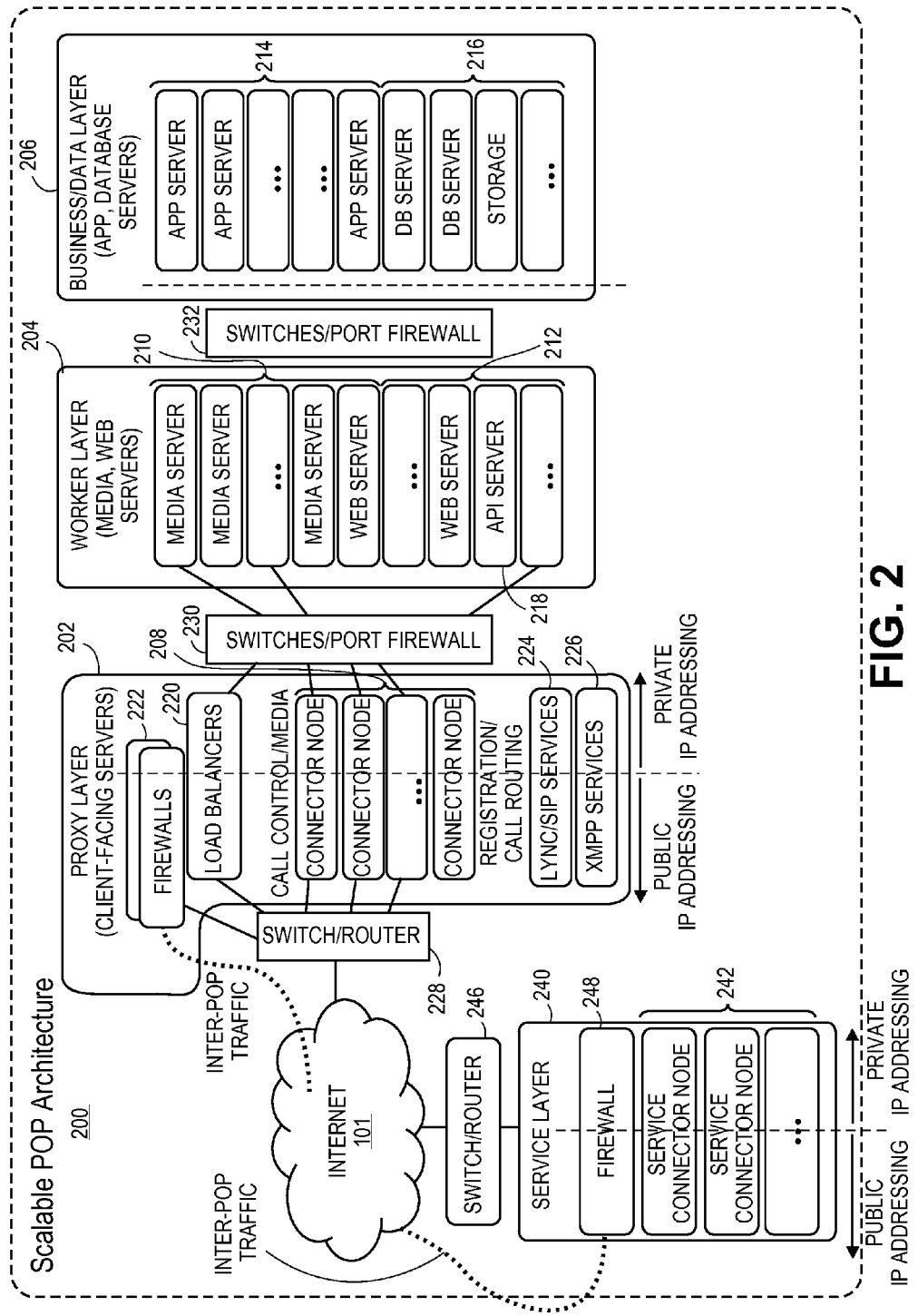
FIG. 2 depicts an exemplary system in accordance with some embodiments of the invention.

FIG. 2 depicts an exemplary system in accordance with some embodiments of the invention. FIG. 2 depicts a Scalable POP Media Processing Node Architecture 200 (e.g., architecture for POPs 102, 104, 106, 114, and 122) accessible over a network 101 with a Proxy Layer 202, a Worker Layer 204, a Business/Data Layer 206, and a Service Layer 240. Some of the components/elements of the Scalable POP Architecture 200, include, but are not limited to, the following: load balancers 220, firewalls 222 and 248, media servers collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), applications servers collectively 214 for supporting web applications (e.g., for providing functionality to the user, such as conference control, screen and presentation sharing, chat, etc.), service connector nodes collectively 242 for handling particular communication events. The components may be distributed across the nodes and/or POPs of the globally distributed infrastructure 100 for enabling real-time or nearly real-time communication. Components may be connected on a network and can communicate over networks utilizing switches and routers as shown with 228, 230, 232, and 246.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the service connector nodes 242 in the Service Layer 240 may receive requests for managing communication events for one or more users. Service connector modules (e.g., service connectors) at the service connector nodes 242 may determine distribution schemes appropriate for a participant endpoint, and may request instantiation and services of protocol connectors and other services in the Proxy Layer 202.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 210 of the Worker Layer 204, such operation of the media servers 210 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 202 with a protocol connector node 208.

In some embodiments, global infrastructure 100 provides a high-level mechanism for fault tolerant protocol handling to prevent improper input from causing instability and possible security breach via protocol connector 208 or media servers 210. Media processing tasks by protocol connectors 208 and/or media servers 210, such as processing of protocol control messages and compressing audio and video streams may be isolated in one or more separate, independent, unprivileged processes. More specifically, (1) Separate processes: each incoming connection may cause a new process to be created by protocol connector node 208 and/or media server 210 to handle it. This process may be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. In this way, if this process crashes, no other part of the system may be affected except the conference endpoint handled by that process.

(2) Independent processes: each connection may be handled in its own process. A given process in a protocol connector node 208 and/or media server 210 may be responsible for one videoconference endpoint, so that if this process crashes, only that single endpoint will be affected and everyone else in the system will not notice anything.

(3) Unprivileged processes: each process should be as isolated as possible from the rest of the system. In some embodiments, to accomplish this, ideally each process runs with its own user credentials, and may use the chroot( ) system call to make most of the file system inaccessible.

(4) Performance considerations: protocol connector 208 and/or media server 210 may introduce several processes where typically only one exists and brings about the possibility of performance degradation, especially in a system handling audio and video streams where a large amount of data needs to be moved between processes. To that end, shared memory facilities can be utilized to reduce the amount of data that needs to be copied.

In some embodiments, media servers 210 are designed to convert and compose several videoconference feeds of video and audio streams in real-time to create and render one or more composite multimedia streams for each participant to the video conference (e.g., VMR). Media servers 210 may include as its components one or more of: video compositor, video transcoder, distributed multicast video switch, audio transcoder/pre-processor, distributed multicast audio mixer, a reflector, and each component may be in communication with protocol connector 208, a service connector of a service connector node, and a distributed conference session controller. In the case of video, the video streams from the participants are made available at the media server 210 in three (or more) forms: original compressed video, uncompressed raw video, and a lower resolution compressed thumbnail video.

By way of example, a video compositor of a module executing on a media processing node 210 subscribes to whichever video stream it needs based on the set of videos needed to compose and be rendered to the participants. The two (or more) compressed forms of the video streams listed above may be transcoded by video transcoder sent by distributed multicast video switch using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public Internet, over a private network, or over a provisioned overlay network with service level guarantees. Using this approach, video compositor may show various composites, including but limited to, just the active speaker, two people side-by-side if they are having a conversation, and any other custom format as requested by a participant, which may include transformations of the video into other representations as well. Continuing with the example, a video transcoder of media processing server 210 encodes and decodes composite video streams efficiently, where characteristics of each individual stream can be extracted during decoding.

In some embodiments, video compositor not only composes the raw video stream into a composite video stream but also builds up a composite metadata field in order to apply similar operations (including both 2D and 3D operations) outlined in the metadata field to the individual video streams of the composite video. As a non-limiting example, motion vectors need to be applied with the same transformation that video compositor may apply to each raw video stream, including but not limited to, scaling, rotation, translation, shearing. This metadata could be used for other non-real-time multimedia services including but not limited to recorded streams and annotated streams for offline search and indexing.

In some embodiments, application server 214 (e.g., a user experience engine) renders multimedia content including but not limited to the composite audio/video stream to each of the participants to the video conference for an enhanced User Experience (UE) for the participants. The UE provided by the application server 214 to the participants may comprise one or more of the following areas:

(1) Physical interaction with the video conference endpoint. The application server 214 provides a web application that enables controlling the setup and management of a multi-party video conferencing session in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well that the Internet/cloud based software recognizes and translates into actionable events.

(2) User interface (UI) associated with a web application allows the participants to interact with the video conference system for video conference session. Here, application server 214 controls the interaction of the moderator and the conferencing participants. Through an intuitive UI provided by application server, participants to the video conference can control such features such as video layouts, muting participants, sending chat messages, screen sharing and adding third-party video content.

(3) Video/Multimedia content. Application server 214 controls content rendered in the form of screen layouts, composite feeds, welcome banners, etc. during the video conference as well as what the participants see when they log into a video conference, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls.

(4) Customization of the video conference session for a specific (e.g., vertical industry) application. Application server 214 allows customization of the user interface in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

(5) Personalization of the video conference as per the moderator's and/or the participants' preferences and privileges. Application server 214 provides the moderator the ability to personalize the meeting when scheduling a video conference. Examples of such customization include but are not limited to, the following: the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, application server 214 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, application server 214 eliminates a lot of these limitations of the conventional video conference systems. For a non-limiting example, application server 214 enables participant's associated different types of video conference endpoints to talk to each other over the Internet during the video conference. For a non-limiting example, participants from H.323 endpoints can to talk to participants from desktop clients such as Skype, and both the moderator and the participants can choose from a wide variety of options. In addition, by providing the ability to terminate the service in the cloud, application server 214 enables access to a much richer set of features for a conference call that a participant can use compared to a conventional passively bridged conference call. More specifically, every participant can have control of one or more of:

(1) Which active participants to the session to view in his/her video windows on the screen of his/her video conference endpoint.

(2) Layout options for how the different participants should be shown on the screen of his/her video conference endpoint.

(3) Layout options on where and how to view the secondary video channel (screen sharing, presentation sharing, shared viewing of other content) on the screen of his/her video conference endpoint.

Using such in-meeting controls, a moderator can control security and privacy settings for the particular call in ways. The moderator of the call, in addition to the aforementioned options, has a richer suite of options to pick from through a web interface to manage and control the video conference, which include but are not limited to, (1) Muting subsets of participants during a call.

(2) Sharing content with subsets of participants during the course of a call.

(3) Prescribing a standard layout of the screen of his/her video conference point and a set of displayed callers for other participants to see.

(4) Choosing to display caller-specific metadata on the respective video windows of a subset of the participants, including user-name, site name, and any other metadata.

(5) Easy and seamless way to add or remove participants from the video conference call through a real-time, dynamic web interface.

(6) Easily customizable welcome screen displayed to video callers on joining the call that can display information relevant to the call as well as any audio or video materials that the service provider or the call moderators wishes for the participants to see.

(7) Choosing roles associated with communication modes for participant users.

In some embodiments, application server 214 enables private conferences by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, application server 214 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

In some embodiments, application server 214 utilizes the MCUs of the global infrastructure 100 to offer an easy, quick, and high-quality solution for event sharing. More specifically, application server 214 enables one initiating participant to invite a group of other participants for a shared video conference call via a web application. Once everyone joins in the VMR to share online videos and content, an initiating participant may provide a uniform resource locator (URL) where the content is located and the content may be streamed into a VMR directly from the content source whether the content is local to the initiating participant device or located remotely and accessed over the Internet from a third party web site or content store. Participants may continue to have conversations with other participants while watching this content. Other features provided include, but are not limited to, the following: altering the layout of the content in terms of where it is visible, adjusting the audio level, adjusting whether it should be muted or not, and adjusting whether it should be paused or removed temporarily are in the control of the person sharing the content (e.g., similar to the management and control by a moderator to a video conference as discussed above). Such an approach provides a compelling and novel way to watch live events among groups of people whose locations are geographically distributed, yet want to experience an event together. This enables a whole new set of applications around active remote participation in live professional events such as conferences and social events, such as weddings.

In some embodiments, application server 214 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that one need to carry out using the endpoints' native interface and moves all of those functions to a set of interfaces running on a device familiar to most users—desktop PC, laptop PC, mobile phone or mobile tablet, and thus makes the user experience to control the VMR mostly independent of the endpoint devices' user interface capabilities. With such device-independent control of the video conference, application server provides flexibility, ease-of-use, richness of experience and feature-expansion that it allows to make the experience far more personal and meaningful to participants.

In some embodiments, application server 214 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connected to the same VMR hosting the video conference.

Joining a video conference from H.323 endpoints today often involve cumbersome steps, which must be performed via a remote-control for the endpoint device. In addition to logistical issues such as locating the remote in a room, there are learning-curve related issues, such as finding the correct number to call from the directory, entering a specified code for the call from the remote, etc. In some embodiments, an endpoint can be setup to always just dial one number when it is turned on or woken up from sleep. Once the call is established, then a different user interface, such as a web application or mobile device client application, can be used to select which meeting to join.

In some embodiments, application server 214 provides a user experience with a user interface rendering to the participants welcome screen content that includes, but is not limited to, the following: an interactive welcome handshake, a splash screen, interactions for entering room number related info, and a welcome video, etc. for video conferences. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as an agenda, names of the parties calling in, company related statistics etc. Such content could also be more generic for non-business applications, including any flash content including videos, music, animations, advertisements, etc. Upon joining the call, the display also may show a code that is specific to the participant on his/her screen, which can be applied to the content on the call for content sharing. The code can also be entered from a web application used for the call or can be provided through voice or visual commands that are recognized and processed by software in the internet cloud that are then translated into actionable events.

Figure 3:
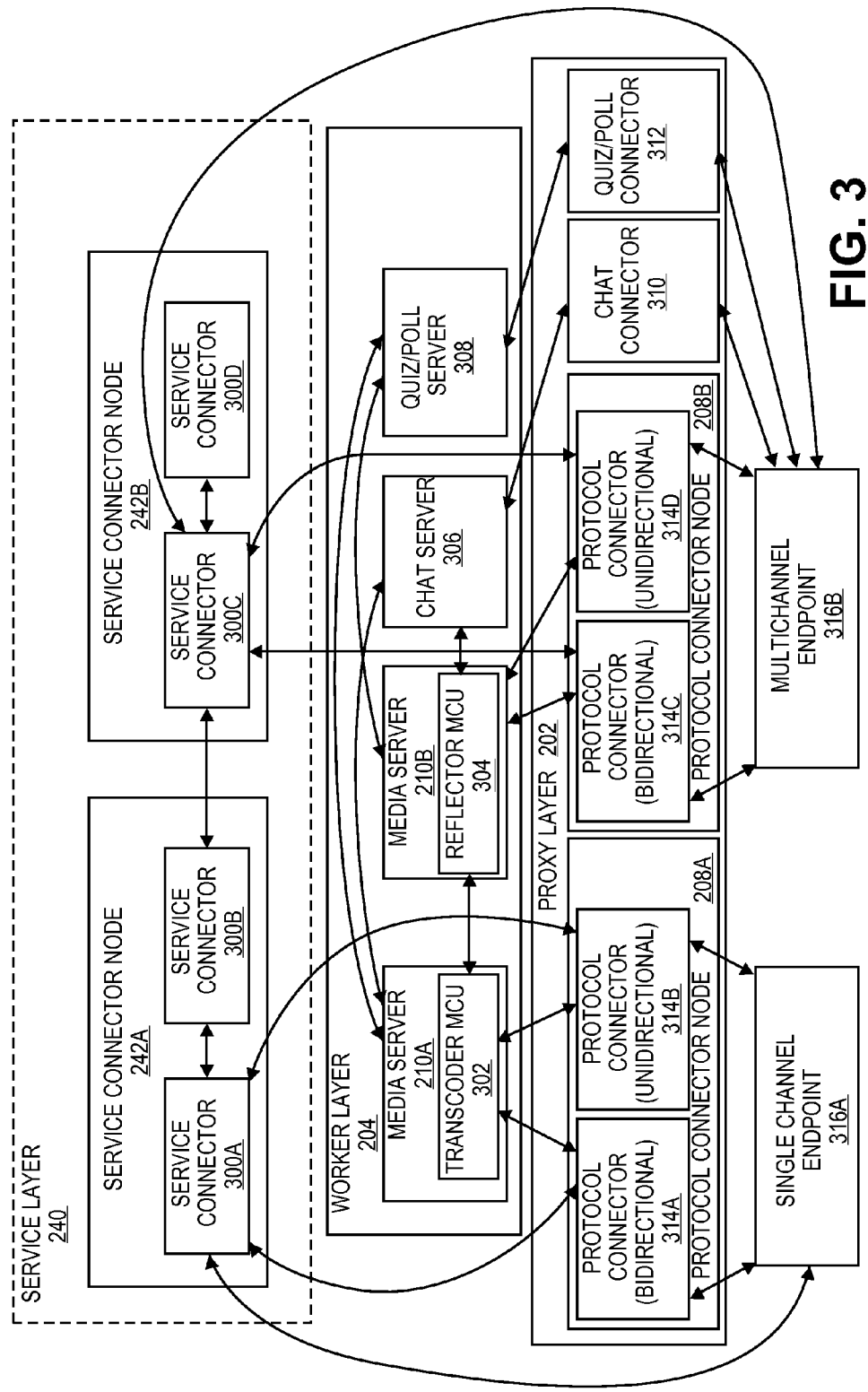
FIG. 3 depicts an exemplary system in accordance with some embodiments of the invention.

FIG. 3 is an exemplary system in accordance with some embodiments of the invention. FIG. 3 illustrates the use of the service layer 240, the worker layer 204, and the proxy layer 202 of a video conference system in some embodiments. Endpoint 316A and/or endpoint 316B (collectively 316) may communicate with a service connector 300A-D (collectively 300) to participate in a communication event. The service connector 300 instantiated and executing on service nodes 242A-B (collectively 242) manages the communication event session for one or more participant endpoints 316. For example, the service connector 300 may manage an HTTP session for the participant endpoint 316 for the duration of the video conference. In some embodiments, at least one service connector 300 may be instantiated for each participant endpoint 316 to manage the communication event for the respective participant endpoint.

By way of example, an endpoint 316A may send a request to join a communication event to a service node 242A and a service connector 300A may be instantiated to manage the communication event for the endpoint 316. The service connector 300A may determine the capabilities of the endpoint 316A and/or the role of the participant user to determine a distribution scheme for the presentation of the communication event on endpoint 316. The moderator may assign the role to the participant user with the invitation to the participant user and dynamically during the video conference. The role may be defined by a set of rules, responsibilities, and/or authorized capabilities available to the participant user. For example, the role may define the communication mode available to the participant user accessing the communication event with a participant endpoint device.

The communication mode may be a unidirectional communication mode, bidirectional communication mode, or any other communication mode. In a bidirectional communication mode, data may be received from the endpoint 316 and combined with data streams from other presenter participants for the communication event. A bidirectional communication mode is not limited to the use of a bidirectional connection with data received by the endpoint and sent to the endpoint over the same channel. Those with skill in the art will recognize that multiple channels and connections may be used to support a bidirectional communication mode. In a unidirectional communication mode, data may not be received from the endpoint 316 and/or any received data from the endpoint may not be combined with other data streams from other presenter participants. A unidirectional communication mode is not limited to the use of a unidirectional connection with data sent to the endpoint with a single connection over a single channel. For example, a bidirectional connection may be used for a unidirectional communication mode and the data flow from the endpoint may be muted to ensure that the data from an endpoint is not combined into the composite for the video conference.

The service connector 300 may determine the capabilities of the endpoint to select a distribution scheme for sending data to the endpoint for the communication event. The service connector 300A may request instantiation, use, and/or manage a protocol connector 314A and 314B for the endpoint 316 to handle the distribution scheme. By way of example, endpoint 316A may be a single channel endpoint that is capable of sending and/or receiving data on a single channel for the communication event, and the appropriate distribution scheme may be established for the single channel endpoint. In another example, an endpoint capable of sending/receiving data from multiple channels endpoint, the endpoint may receive data on multiple channels that may be combined at the endpoint for the presentation of the communication event.

The service connector 300 may also manage other connectors (e.g., chat connector 310, quiz/poll connector 312, or any other services) for provision of the data for the video conference to the endpoint 316. Continuing with the example, multichannel endpoint 316B may receive data streams from a chat connector 310 and/or a quiz/poll connector 312 that may be combined at the endpoint 316 for presentation of the video conference to the user. A single channel endpoint 316A may have data streams from other services (e.g., chat connector, quiz/poll connector, etc.) to be combined and presented to the user. In some embodiments, the data streams from other services may be combined at a media server for the single channel endpoint 316A.

Instructions may be provided to the reflector MCU 304 and transcoder MCU 302 by protocol connectors 314A-D (collectively 314) managing media processing for their respective video conference participant endpoint devices 316. In some embodiments, a stateless reflector MCU 304 used in combination with a transcoder MCU 302 in a worker layer 204 of the POP architecture 200 in a globally distributed infrastructure 100 for a video conferencing system. The stateless reflector MCU 304 and transcoder MCU 302 communicate with other elements to handle media processing for a video conferencing session including, but not limited to, the following: elements in the worker layer 204, business/data layer 206, other reflector MCUs 304, and other transcoder MCUs 302. Examples of reflector MCU and transcoder MCU combinations that may be practiced in some embodiments are provided in U.S. patent application Ser. No. 14/216,401, "PROVISION OF VIDEO CONFERENCING SERVICES USING REFLECTOR MULTIPOINT CONTROL UNITS (MCU) AND TRANSCODER MCU COMBINATIONS," filed Mar. 17, 2014, incorporated herein by reference in its respective entirety. Those with skill in the art will recognize the present invention is not restricted to just one reflector MCU communicating with one transcoder MCU, and that communication can occur between any number of reflector MCUs and transcoder MCUs. By way of example, one or more reflector MCUs and/or transcoder MCUs can communicate with each other in a star topology. Each element may be implemented with software, specially configured hardware, and/or any combination thereof.

Participant endpoint devices may execute or request execution of a client application on the participant device to participate in the video conference. In some embodiments, one protocol connector 314 (e.g., 314A) is instantiated per participant device 316 to ensure that one protocol connector 314 failure does not cause the entire video conference to fail. A new protocol connector 314 may be instantiated and/or spawned for the video conference participant endpoint device 316 upon failure of the protocol connector.

As shown in FIG. 3, protocol connectors 314 may communicate with reflector MCUs 304, transcoder MCUs 302 (e.g., using multiple data stream communication 316B with protocol connectors 314C and 314D, and single stream communication with protocol connectors 314A and 314B, etc.), and other protocol connectors 314 to ensure media processing is performed for the respective participant endpoint 316 that the protocol connector 314 is supporting. In some embodiments, a protocol connector 314 that is supporting an endpoint executing the client application that has the capability to create a composite of data streams for the presentation of the video conference. The stateless reflector MCU 302 may ensure data streams are forwarded to the respective multichannel endpoint 316B for composition. By moving the work of creating the composite data stream to the endpoints, work is moved out of the connector nodes 208 and/or media servers 210 of the video conference system and the resources of the endpoints 316 may be utilized where possible to create a system with scalability.

In some embodiments, the endpoint 316B with composition capabilities may support one or more communication protocols for composition of received data streams, and as a result, protocol connector 314 (e.g., 314C) may utilize a transcoder MCU 302 to transcode data streams not supported by the client application at the participant device 316B to be sent for composition at the participant device 316B. As shown, in FIG. 3, the endpoints 314 may support a RTP communication protocol and as such, the underlying reflector may be referred to as an "RTP pump."

Multiple data stream communication may be used between the stateless reflector 304 and the transcoder MCU 302 to send only the necessary streams between the two MCUs. As a result, legacy endpoints 316A may experience higher quality video conferences. If legacy endpoints 316A that are connected to transcoder MCU 402 need to be visible and audible to all the endpoints connected to reflector MCU 304, then transcoded streams for each of the endpoints 316 are sent over to reflector MCU 304 using multiple data stream communication. Similarly, if multi-channel endpoints 316B that are connected to the reflector MCU 304 need to be visible and audible to all the endpoints connected to transcoder MCU 302, then streams for each of endpoints 316B are sent over to the transcoder MCU 302 using the multiple data stream communication. As a result all legacy and multi-channel endpoints 316B get to see all endpoints that are visible and/or audible in any layout and the minimal number of streams are transcoded at the transcoder MCU 302 and traverse the multiple data stream communication path. In some embodiments, protocol connectors 314 (e.g., 314B) may communicate with other protocol connectors (e.g., 314C) in order to make adjustments in the provision of data streams to the various endpoint client applications and/or other elements for media processing.

Figure 4:
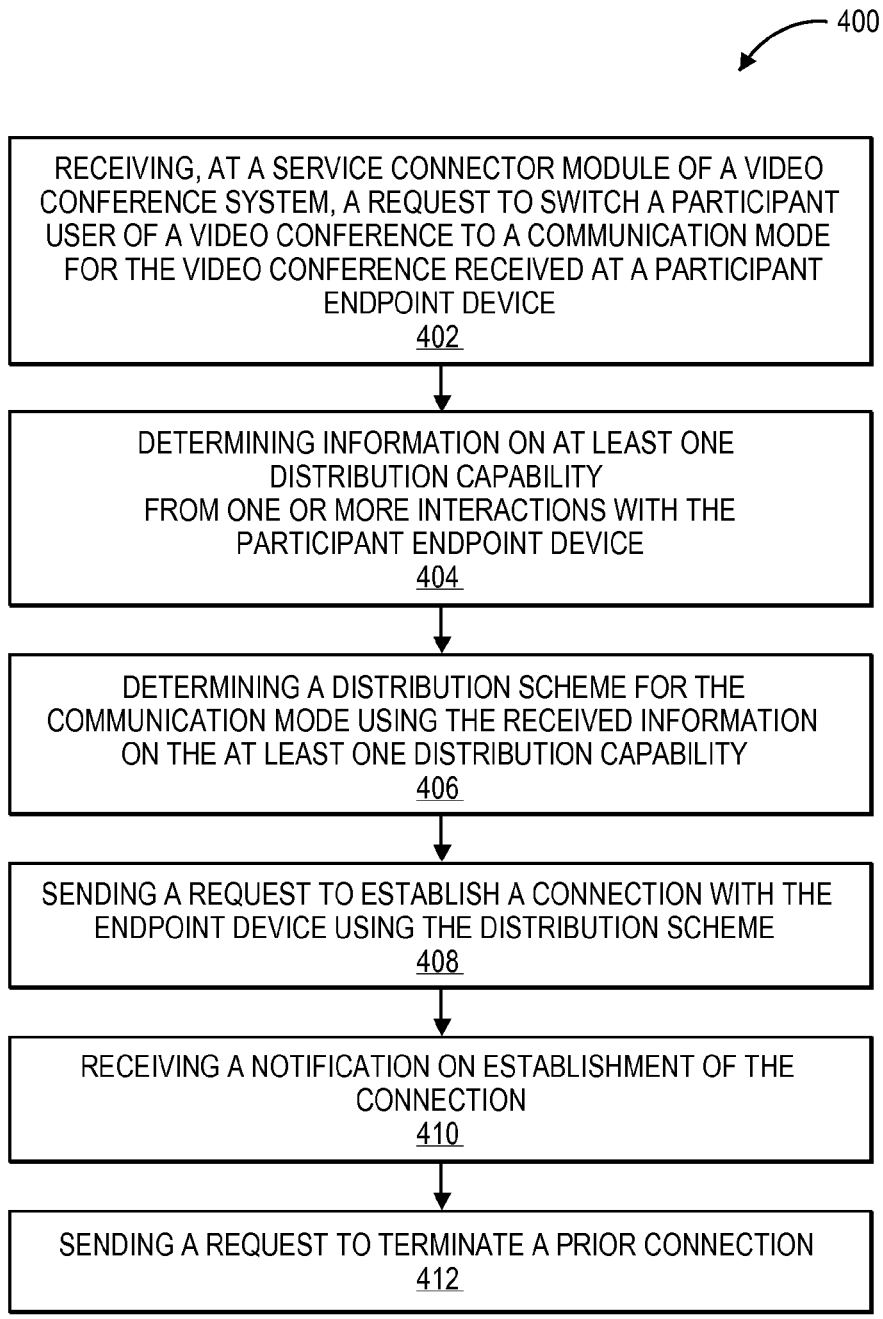
FIG. 4 is a flowchart for an exemplary process in accordance with some embodiments of the invention.

FIG. 4 is an exemplary flowchart 400 in accordance with some embodiments of the invention. At a service connector module of a video conference system, a request to switch a participant user of a video conference to a communication mode is received (402). The participant user of the video conference sends the request to change the communication mode for a composite of data streams for the video conference received at a participant endpoint device. By way of example, the request may be to switch from a unidirectional communication mode to a bidirectional communication mode or a request to switch from the bidirectional communication mode to the unidirectional communication mode. In a bidirectional communication mode, the participant user may contribute audio and/or video data streams to the composite of audio and/or video data streams for the communication event presented to participants. In a unidirectional communication mode, the participant user may not contribute audio and/or video data streams to the composite of the audio and/or video data streams for the communication event.

In some embodiments, the request may be in the form of a request to switch roles that are defined to be associated with particular communication modes for the communication event. For example, the participant user having an attendee participant role may receive the data for the communication event using a unidirectional distribution scheme may request to switch to a presenter participant role to receive and send data for the communication event using a bidirectional distribution scheme. The video conference system may send a request to a user with a moderator role to approve the request for the participant user. After the moderator user approves the request to switch roles, a distribution scheme for the communication mode defined by the approved role may be selected.

Information on at least one distribution capability available for a client application and/or an endpoint device may be determined from one or more interactions with the participant endpoint device (404). A distribution capability may include, but is not limited to, the following: one or more protocols supported by the endpoint device and/or the client application executing on the endpoint device for presentation of the video conference, an accessible infrastructure element to the endpoint device, whether the endpoint is a multichannel or single channel endpoint device, and any other factors for determining a distribution scheme. Interactions between the participant endpoint device and the elements of the video conference system may be used to determine capabilities of the client application and/or the participant endpoint device. Interactions with the participant endpoint device may be requests received and/or responses received from the participant endpoint device. The interactions may be used to determine the type of endpoint device, the type of client application, protocols supported, and/or infrastructure elements accessible to the endpoint device. The interactions may be from the current session and/or prior sessions with the endpoint device. A capability profile may be stored for the participant endpoint device and/or client application with the capabilities of the device from prior interactions with the participant endpoint device.

By way of example, the received request to switch communication modes may be used to identify the type of endpoint device, the type of client application, the type of operating system, and/or network infrastructure elements available to the endpoint device to determine the corresponding distribution capabilities of the endpoint device and/or client application. In some cases, information within the request may allow for identification of the endpoint device and/or the client application used by the endpoint device. For example, the initial request to switch communication modes may include an identifier for the endpoint device and/or an identifier for the client application used by the endpoint device that allows for identification of the endpoint device/the client application and corresponding protocols supported by the device and/or client application. With knowledge of the type of endpoint device and/or type of client application used by the endpoint device, the protocol capabilities of the participant endpoint device may be determined. For example, if the endpoint device is identified as a room system, then the endpoint device may use the H.323 protocol. In another example, if the participant endpoint device runs a particular operating system (e.g., iOS) and/or a client application, then a particular communication protocol may be supported by the operating system (e.g., HLS) and/or client application.

In some cases, the received request may indicate the infrastructure elements (e.g., POPs) available to the endpoint device. By way of example, the received request to switch may indicate the infrastructure elements because the request to switch may be received by the service connector module from the available infrastructure elements (e.g., an available MicroPOP). In some cases, the infrastructure elements may be identified by an IP address or a range of IP addresses associated with an infrastructure element included with the request to switch. In another example, the request to switch may be received from the endpoint device using a particular network (e.g., LAN) and information may be stored with the video conference system on various capabilities available for the particular network.

In other embodiments, the participant endpoint device and/or client application may be queried to indicate distribution capabilities that may impact the distribution scheme. A distribution capability profile may be stored on distribution capabilities for the particular participant endpoint device, the particular client application, the type of participant endpoint device, and/or the type of client application.

A distribution scheme may be determined for the communication mode using the received information on the at least one distribution capability (406). The selection of a distribution scheme may be based upon various criteria, including, but not limited to the following: the capabilities of the participant endpoint device, proximity or access of the endpoint to an infrastructure element (e.g., access to a MicroPOP), status and/or load for infrastructure elements, preferences for the communication event, preferences for a participant user, preferences for a particular endpoint device or client application, or cost associated with a distribution scheme (e.g., monetary costs, costs to overall system). For example, in the simplest case, for a single channel endpoint 316 that supports an H.323 protocol or PSTN, a switch in communication modes may require a distribution scheme (1) muting a data flow from the endpoint to achieve a unidirectional communication mode or (2) allow the data flow received from the endpoint to be combined into the composite to achieve the bidirectional communication mode.

In other cases, if the client application supports a particular protocol (e.g., has HLS player/viewer or HDS player/viewer), then the distribution scheme may need to accommodate the endpoint device supported protocol (e.g., HDS, HLS, RTMP). By way of further example, if an endpoint device supports the HDS protocol (e.g., has an Adobe System Flash player), then the distribution scheme may be to send the composite to the endpoint device using HDS. In some cases, the composite stream may be sent to the endpoint device using a Content Delivery Network (CDN), such as Akamai Content Delivery Network.

In some embodiments, the infrastructure elements accessible to the endpoint device may determine the distribution scheme for the endpoint device. For a unidirectional communication mode, an endpoint device may have access to infrastructure elements that may determine the selected distribution scheme for the endpoint device. Infrastructure elements accessible to the endpoint that may determine the appropriate distribution scheme, include, but are not limited to the following: (1) an endpoint device may have access to a MicroPOP with a reflector MCU within their enterprise network, (2) an endpoint device may have access to a network (e.g., LAN) with other endpoints requesting the video conference and the video conference may be multicast to the requesting endpoint devices on the network, and (3) an endpoint device may have access to a network supporting resource sharing (e.g., peer to peer network).

Infrastructure element profiles may be stored for particular networks, MicroPOPs, and/or other infrastructure elements to help determine the distribution scheme. The profile may store information on endpoint devices currently accessing the communication event to allow for resource sharing or multicasting availability for the participant endpoint device. The infrastructure element profile may store historical information on the particular distribution schemes available for the participant endpoint device. After identification of the infrastructure element accessible to the participant endpoint device, the infrastructure element profile may be accessed to determine a preferred distribution scheme.

In some embodiments, distribution scheme selection may be limited by the available distribution capabilities and there may be only one possible distribution scheme for support of the communication mode. For example, distribution schemes available to a particular endpoint device (e.g., a H.323 room system) may be limited to use of particular protocol and a specific connection may continue to be used. Other times, the participant endpoint device may have multiple distribution schemes available and the service connector module of the video conference system may determine the preferred distribution scheme from available options. This may be determined using any available data by the service connector modules, including, but not limited to, the following: logged data on past successful schemes, currently supported distribution schemes for endpoint device with similar distribution capabilities (e.g., on the same network), availability of resources (e.g., workload on a particular MicroPOP), costs associated with support (e.g., cost for using third party services versus negligible cost of using MicroPOP) and/or any other data that may impact the distribution of the composite data stream for the communication event.

A request to establish a connection with the endpoint device in accordance with the communication mode using the distribution scheme may be sent to the endpoint device (408). The service connector module may direct a protocol connector to establish the connection. In some embodiments, the service connector module may instantiate a new protocol connector module to establish the connection supporting the new communication mode with the endpoint device. A new connection may be established with the endpoint device in accordance with the distribution scheme for the communication mode. By way of example, a new protocol connector 314C may be instantiated to support a bidirectional communication mode for multichannel endpoint 316B.

In other embodiments, such as for support of H.323 and PSTN endpoint devices, the audio/video data flow from the endpoint device may no longer be muted and may be combined for presentation in the video conference. In such a case, the same protocol connector may be used and a new protocol connector may not be instantiated.

Upon receipt of a notification that the connection is established for the endpoint device at the service connector module (410), a request may be sent by the service connector module to terminate the prior connection for the endpoint device (412). By way of example, service connector 300C may request that the connection between 314D and 316D be terminated and the multi-channel endpoint 316B may use the protocol connector 314C.

Figure 5:
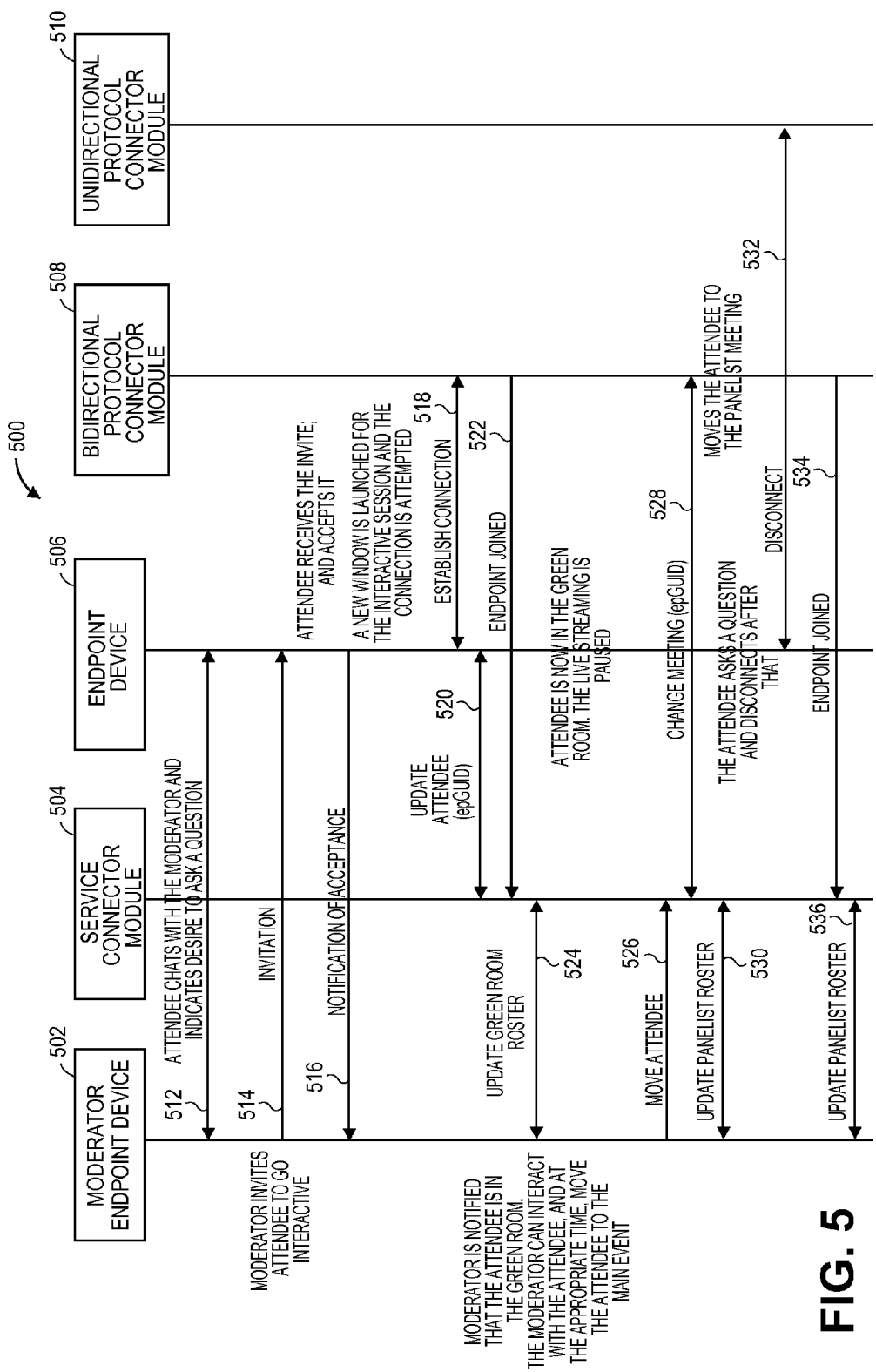
FIG. 5 is an interaction diagram for an exemplary process in accordance with some embodiments of the invention.

FIG. 5 is an interaction diagram 500 for an exemplary process in accordance with some embodiments of the invention. Interaction diagram 500 illustrates an example of the interactions between a moderator participant endpoint device 502, a service connector module 504, a participant endpoint device 506 requesting to switch communication modes, a bidirectional communication mode protocol connector module 508, and a unidirectional communication mode protocol connector module 510. The participant endpoint device 506 has an attendee role in the communication event and is receiving the communication event with a distribution scheme for a unidirectional communication mode. At 512, the participant endpoint device 506 requests to switch to a bidirectional communication mode. The request is received by the moderator participant endpoint device 502. At 514, the moderator participant endpoint device 502 sends an invitation to the participant endpoint device 506 and the invitation is to switch to a presenter role and have a bidirectional communication mode. At 516, the participant endpoint device 506 sends a notification of acceptance of the presenter role and to switch communication modes. At 518, the participant endpoint device 506 requests to establish a connection using a bidirectional protocol connector module 508. The service connector module 504 determines a distribution scheme in accordance with the distribution capabilities of the endpoint device 506.

At 520, the service connector module 504 updates video conference state information for the video conference to indicate that the endpoint device 506 is a presenter. The change in role and communication mode for the endpoint device 506 may be presented to the moderator and other participants. At 522, a status is sent to the service connector module 504 that the participant endpoint 506 connection is established for the bidirectional connector module 508. At 524, the moderator is notified that the connection is established for the participant endpoint device 506, and the live streaming of the video conference to the endpoint device 506 is paused. In some embodiments, the stream is paused to save a place (e.g., an indicator of how much of the stream the participant user has viewed) in the stream for the endpoint device. Optionally, the participant user may continue from the recorded place in the stream, if the moderator denies the request to switch and/or the switch to the new communication mode is unsuccessful. At 526, the moderator participant endpoint device 502 sends a request to the service connector module 504 to use the bidirectional distribution scheme for the endpoint device 506, and at 528, the service connector module 504 requests that the bidirectional protocol connector module 508 provide the composite to the endpoint device 506. At 530, the moderator is informed that the participant endpoint device 506 is now a presenter. The endpoint device (formerly having an attendee role and unidirectional communication mode) may ask a question that is included in the composite for the video conference. At 532, the endpoint device 506 requests to disconnect the prior connection managed with the unidirectional protocol connector module 510, and at 534, the endpoint 506 informs the service connector module 504 that it has joined the video conference as a presenter. By waiting to establish the new connection before disconnecting the prior connection, a failure to switch to a new communication mode may be handled by having the endpoint device continue to receive the video conference composite from the prior connection. At 536, the moderator is informed that the switch is completed.

Figure 6:
FIG. 6 is an exemplary user interface in accordance with some embodiments of the invention.

FIG. 6 is an exemplary user interface in accordance with some embodiments of the invention. As shown in FIG. 6, a user may schedule a communication event with user interface 600. In some embodiments, a user with the moderator role may create the event using the exemplary user interface 600.

Figure 7:
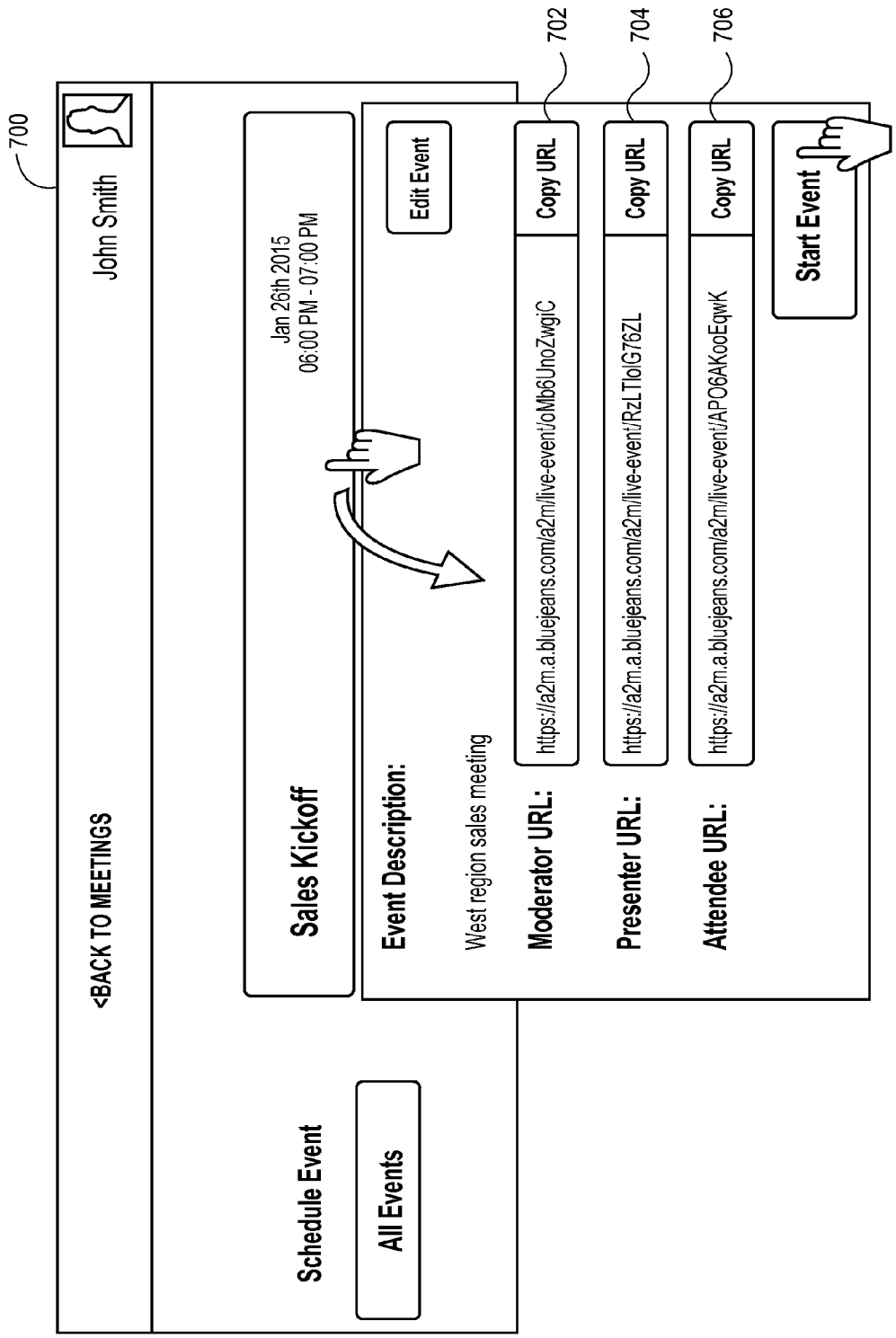
FIG. 7 is an exemplary user interface in accordance with some embodiments of the invention.

FIG. 7 is an exemplary user interface in accordance with some embodiments of the invention. User interface 700 provides uniform resource locators (URLs) that may be copied and sent to users in invitations to access the communication event. A URL may be provided in accordance with the role (e.g., moderator 702, presenter 704, and attendee 706) that the moderator desires for each participant user. FIGS. 8-10 are exemplary user interfaces for assigning users to roles (e.g., moderator in user interface 800, presenter in user interface 900, and attendee in user interface 1000) and optionally sending invitations to the users for the communication event.

Figures 11, 12:
FIG. 11 is an exemplary user interface in accordance with some embodiments of the invention.
FIG. 12 is an exemplary user interface in accordance with some embodiments of the invention.

FIG. 11-13 are exemplary user interface in accordance with some embodiments of the invention for invitations to join the communication event according to their role.

Figure 14:
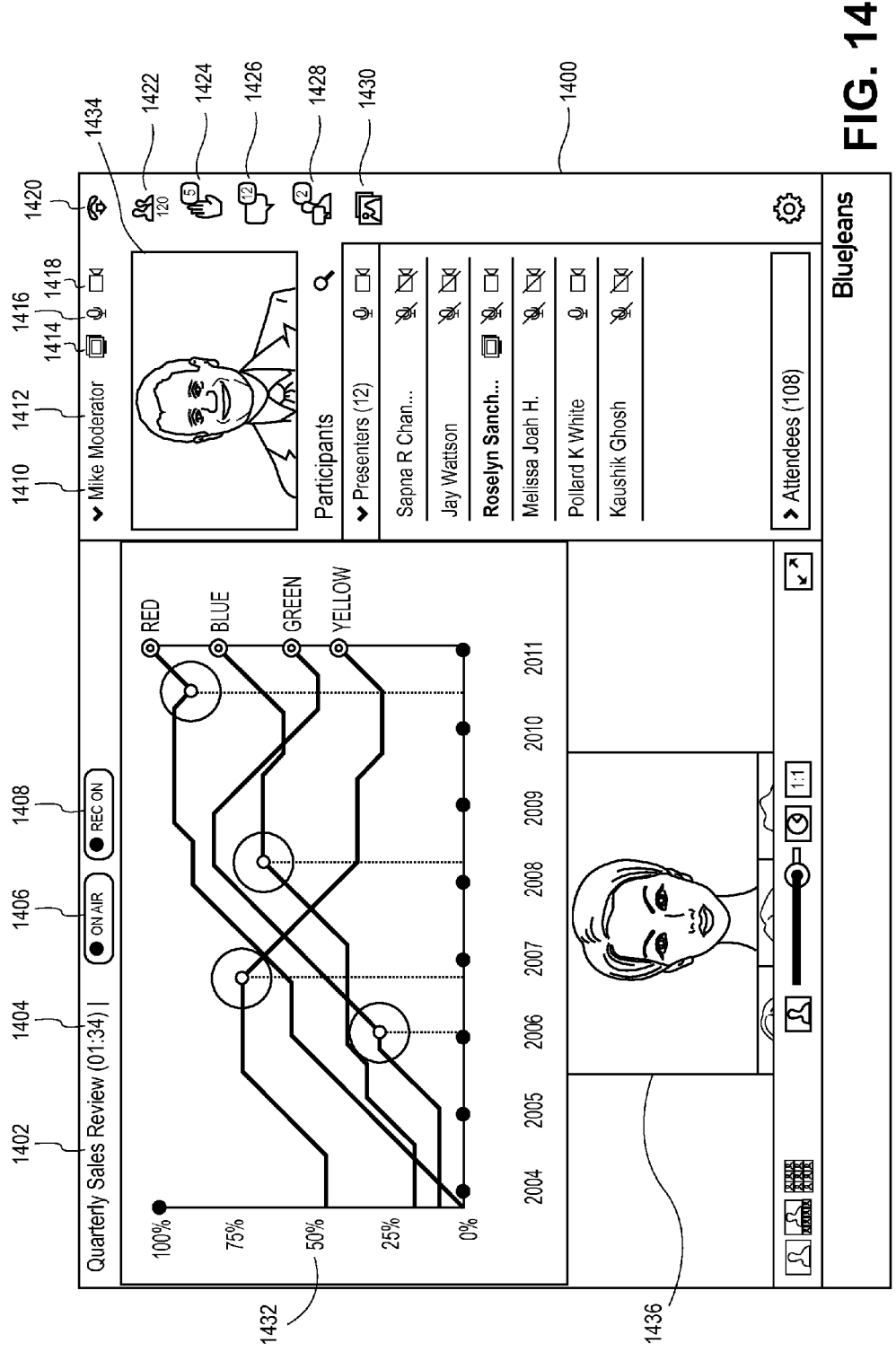
FIG. 14 is an exemplary user interface in accordance with some embodiments of the invention.

FIG. 14 is an exemplary user interface in accordance with some embodiments of the invention. User interface 1400 is an exemplary user interface to allow a moderator to participate and/or manage a communication event. In some cases, user interface elements may serve as both user interface controls and indicators for video conference state. User interface 1400 provides various indicators and/or controls for the communication event, including, but not limited to, the following: title of the communication event 1402 (e.g., "Quarterly Sales Review"), duration of time for ongoing communication event 1404, indicator/control for whether the presentation is ongoing/live (e.g., "on air") 1406, indicator/control for whether communication event video conference is being recorded 1408, participant user name 1410 and role 1412 (e.g., "Mike" and "Moderator"), indicator/control for whether participant is sharing data 1414, indicator/control for sharing audio for contribution to the composite 1416, and/or sharing video 1418 for contribution to the composite, indicator/control for terminating the video conference connection for the user 1420, indicator/control for a participant user list 1422, indicator/control for participant users requesting to switch communication modes/roles 1424, indicator/control for communication event chat session, indicator/control for a chat session for participant users having a moderator role, and indicator/control for sharing data 1430. With user interface 1400, the user may view shared data (e.g., documents, images, etc.), their personal video contribution to the composite 1434, and video shared by other users 1436.

Figure 15:
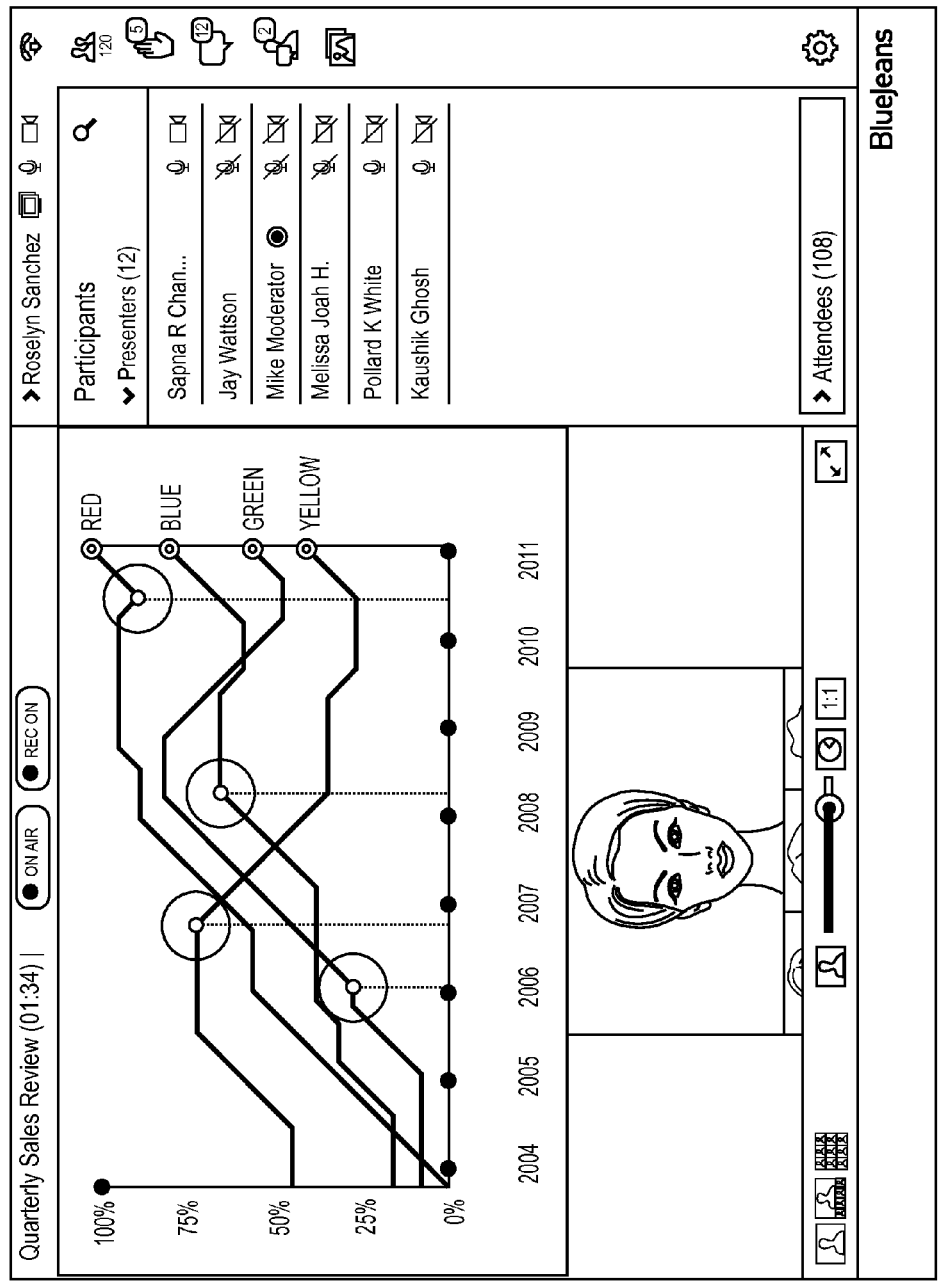
FIG. 15 is an exemplary user interface in accordance with some embodiments of the invention.

FIG. 15 is an exemplary user interface in accordance with some embodiments of the invention. FIG. 15 illustrates a user interface for participant users having a presenter role.

Figure 16:
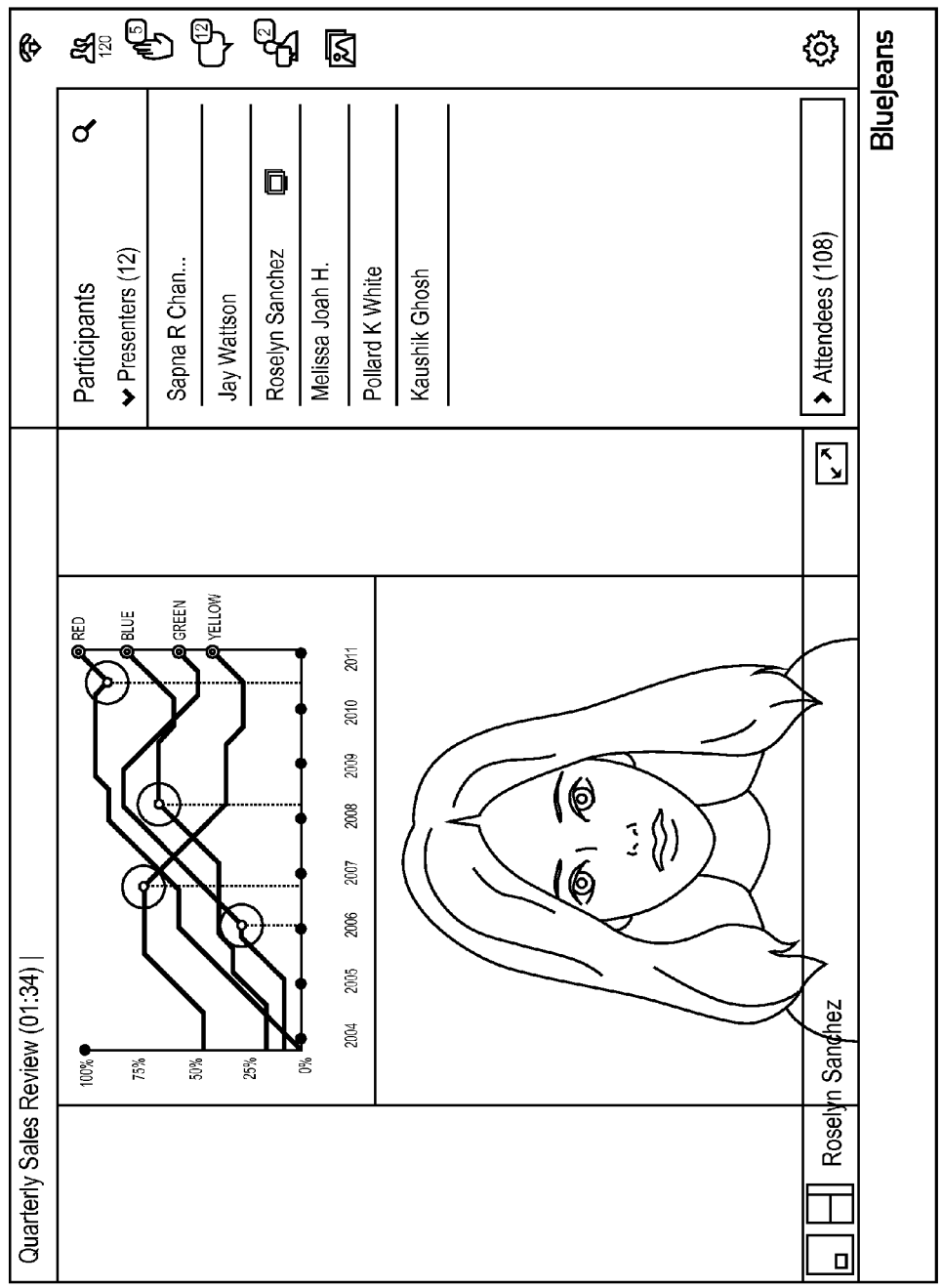
FIG. 16 is an exemplary user interface in accordance with some embodiments of the invention.

FIG. 16 is an exemplary user interface in accordance with some embodiments of the invention. FIG. 16 illustrates a user interface for participant users having an attendee role.

Figure 17:
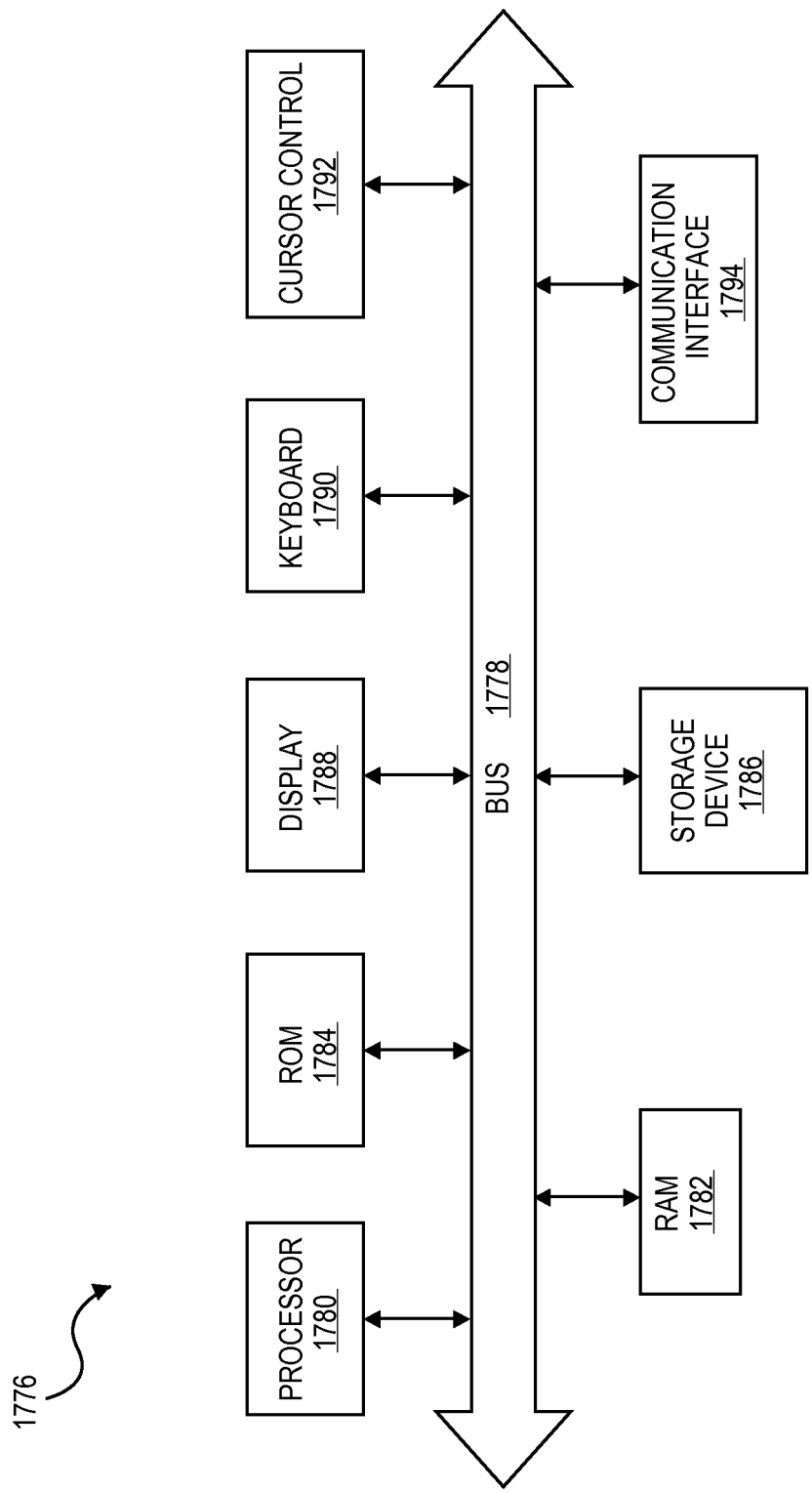
FIG. 17 depicts an exemplary system in accordance with some embodiments of the invention.

FIG. 17 is an exemplary system in accordance with some embodiments of the invention. In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Further the procedures described herein may involve the use of various computer systems and computer readable storage media having computer-readable instructions stored thereon. FIG. 17 provides an example of a computer system 1276 that is representative of any of the computer systems or electronic devices discussed herein. Note, not all of the various computer systems may have all of the features of computer system 1276. Computer systems such as computer system 1276 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 1276 includes a bus 1278 or other communication mechanism for communicating information, and a processor 1280 coupled with the bus for processing information. Computer system 1276 also includes a main memory 1282, such as a random access memory (RAM) or other dynamic storage device, coupled to the bus for storing information and instructions to be executed by the processor. Main memory 1282 also may be used for storing temporary variables or other intermediate information during execution of instructions to be executed by processor 1280. Computer system 1276 further includes a read only memory (ROM) 1284 or other static storage device coupled to the bus for storing static information and instructions for the processor 1280. A storage device 1286, which may be one or more of a hard disk, flash memory-based storage medium, or other storage medium, is provided and coupled to the bus 1278 for storing information and instructions (e.g., operating systems, applications programs and the like).

Computer system 1276 may be coupled via the bus 1278 to a display 1288, such as a liquid crystal or light emitting diode display, for displaying information to a user. An input device 1290, such as a keyboard including alphanumeric and other keys, is coupled to the bus 1278 for communicating information and command selections to the processor. In some embodiments, the keyboard will be a software construct rendered via a touch screen display 1288. Another type of user input device is cursor control device 1292, such as a mouse, a trackball, cursor direction keys, and/or any other input device for communicating direction information and command selections to processor 1280 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented using a processor 1280 executing appropriate sequences of computer-readable instructions contained in main memory 1282. Such instructions may be read into main memory from another computer-readable medium, such as storage device 1286, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 1280 and its associated computer software instructions to implement the invention. The computer-readable instructions may be rendered in any computer language including, without limitation, C#, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1276 or similar electronic computing device, that manipulates and transforms data represented as physical (electronic) quantities within its registers and memories into other data similarly represented as physical quantities within its memories or registers or other such information storage, transmission or display devices.

Computer system 1276 also includes a communication interface 194 coupled to the bus 1278. Communication interface 1294 provides a two-way data communication channel with a computer network, such as a network, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1278 can send and receive messages and data through the communication interface and in that way communication with hosts accessible via the Internet. Computer system 1276 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1276, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention.

What is claimed:

1. A method comprising:
   receiving, at a service connector of a video conference system, a request to switch a participant user associated with a prior connection to a video conference to a communication mode for the video conference received at a participant endpoint device, the request to switch comprising a request to switch from a unidirectional communication mode to a bidirectional communication mode;
   determining information on at least one distribution capability from one or more interactions with the participant endpoint device, the at least one distribution capability available for at least one of a client application and the participant endpoint device, and the client application executing on the participant endpoint device to present the video conference;
   determining a distribution scheme for the communication mode using the at least one distribution capability;
   sending a request to establish a new connection with the endpoint device using the distribution scheme;
   establishing the new connection for the participant endpoint device such that the new connection allows the participant endpoint device to (a) send data to be combined into a composite stream for the video conference and (b) receive the composite stream for the video conference;
   receiving a notification on establishment of the new connection; and
   terminating the prior connection, wherein the prior connection is for receipt of the composite stream for the video conference, and the composite stream for the video conference was provided by a content delivery network.

2. The method of claim 1, wherein the at least one distribution capability is a protocol supported by the participant endpoint device, a protocol supported by the client application executing on the participant endpoint device for presentation of the video conference, or an accessible infrastructure element to the participant endpoint device.

3. The method of claim 1, wherein the at least one distribution capability is an accessible infrastructure element to the participant endpoint device, and the accessible infrastructure element is identified from the request to switch received at the service connector.

4. The method of claim 3, wherein the accessible infrastructure element is at least one of: (a) a MicroPOP with a reflector MCU within an enterprise network, (b) a network with other endpoints requesting the video conference, and (c) a network supporting resource sharing.

5. The method of claim 1, further comprising:
determining a type of participant endpoint device and a type of client application from the received request to switch; and
selecting the distribution scheme associated with a connection using a streaming protocol supported by the type of participant endpoint device and the type of client application.

6. A non-transitory computer readable medium storing computer-executable instructions, which instructions when executed by a processor cause the processor to perform steps comprising:
receive, at a service connector of a video conference system, a request to switch a participant user associated with a prior connection to a video conference to a communication mode for the video conference received at a participant endpoint device, the request to switch comprising a request to switch from a unidirectional communication mode to a bidirectional communication mode;
determine, information on at least one distribution capability from one or more interactions with the participant endpoint device, the at least one distribution capability available for at least one of a client application and the participant endpoint device, and the client application executing on the participant endpoint device to present the video conference;
determine a distribution scheme for the communication mode using the at least one distribution capability;
send a request to establish a new connection with the endpoint device using the distribution scheme;
establish the new connection for the participant endpoint device such that the new connection allows the participant endpoint device to (a) send data to be combined into a composite stream for the video conference and (b) receive the composite stream for the video conference;
receive a notification on establishment of the new connection; and
terminate the prior connection, wherein the prior connection is for receipt of the composite stream for the video conference, and the composite stream for the video conference was provided by a content delivery network.

7. The non-transitory computer readable medium of claim 6, wherein the at least one distribution capability is a protocol supported by the participant endpoint device, a protocol supported by the client application executing on the participant endpoint device for presentation of the video conference, or an accessible infrastructure element to the participant endpoint device.

8. The non-transitory computer readable medium of claim 6, wherein the at least one distribution capability is an accessible infrastructure element to the participant endpoint device, and the accessible infrastructure element is identified from the request to switch received at the service connector.

9. The non-transitory computer readable medium of claim 8, wherein the accessible infrastructure element is at least one of: (a) a MicroPOP with a reflector MCU within an enterprise network, (b) a network with other endpoints requesting the video conference, and (c) a network supporting resource sharing.

10. The non-transitory computer readable medium of claim 6, the instructions when executed by the processor cause the processor to perform further steps comprising:

determine a type of participant endpoint device and a type of client application from the received request to switch; and
select the distribution scheme associated with a connection using a streaming protocol supported by the type of participant endpoint device and the type of client application.

11. A media processing node comprising:
a service connector for managing a video conference communication event for a participant endpoint device, and sending instructions to at least one protocol connector to implement a distribution scheme for the participant endpoint device; and
a processor configured to:
receive, at the service connector, a request to switch a participant user associated with a prior connection to a video conference to a communication mode for the video conference received at the participant endpoint device, the request to switch comprising a request to switch from a unidirectional communication mode to a bidirectional communication mode;
determine information on at least one distribution capability from one or more interactions with the participant endpoint device, the at least one distribution capability available for at least one of a client application and the participant endpoint device, and the client application executing on the participant endpoint device to present the video conference;
determine a distribution scheme for the communication mode using the at least one distribution capability;
send a request to a first protocol connector to establish a new connection with the endpoint device using the distribution scheme;
establish the new connection for the participant endpoint device such that the new connection allows the participant endpoint device to (a) send data to be combined into a composite stream for the video conference and (b) receive the composite stream for the video conference;
receive a notification on establishment of the new connection from the first protocol connector; and
terminate the prior connection with a second protocol connector, wherein the prior connection is for receipt of the composite stream for the video conference, and the composite stream for the video conference was provided by a content delivery network.

12. The media processing node of claim 11, wherein the at least one distribution capability is a protocol supported by the participant endpoint device, a protocol supported by the client application executing on the participant endpoint device for presentation of the video conference, or an accessible infrastructure element to the participant endpoint device.

13. The media processing node of claim 11, wherein the at least one distribution capability is an accessible infrastructure element to the participant endpoint device, and the accessible infrastructure element is identified from the request to switch received at the service connector.

14. The media processing node of claim 13, wherein the accessible infrastructure element is at least one of: (a) a MicroPOP with a reflector MCU within an enterprise network, (b) a network with other endpoints requesting the video conference, and (c) a network supporting resource sharing.

15. The media processing node of claim 11, the instructions when executed by the processor cause the processor to perform further steps comprising:

determine a type of participant endpoint device and a type of client application from the received request to switch; and select the distribution scheme associated with a connection using a streaming protocol supported by the type of participant endpoint device and the type of client application.

* * * * *